United States Patent [19]
Filor et al.

[11] Patent Number: 5,844,609
[45] Date of Patent: Dec. 1, 1998

[54] DECODER AND METHOD FOR DECODING OF CODED PICTURE-, VIDEO- AND FILM INFORMATION

[75] Inventors: Lutz Filor, Minden; Thomas Komarek, Herzogenrath; Christian Krönke, Langenhagen; Manfred Oberwestberg, Hannover, all of Germany

[73] Assignee: SICAN Gesellschaft für Silizium-Anwendungen und CAD/CAT Niedersachsen mbH, Germany

[21] Appl. No.: 561,108

[22] Filed: Nov. 21, 1995

[30] Foreign Application Priority Data

Nov. 21, 1994 [DE] Germany ............... 44 41 294.0
Nov. 21, 1994 [DE] Germany ............... 44 41 291.6
Nov. 21, 1994 [DE] Germany ............... 44 41 292.4
Dec. 13, 1994 [DE] Germany ............... 44 44 231.9

[51] Int. Cl.$^6$ ..................................... H04N 7/12
[52] U.S. Cl. ................ 348/391; 348/403; 364/725; 364/736
[58] Field of Search .................. 348/391, 403, 348/401, 405, 409, 415; 364/725.03, 726.01, 726.02, 726.03; H04N 7/12

[56] References Cited

U.S. PATENT DOCUMENTS

| | | |
|---|---|---|
| 5,268,754 | 12/1993 | Van de Capelle . |
| 5,329,385 | 7/1994 | Washio . |
| 5,331,439 | 7/1994 | Bachar . |
| 5,594,679 | 1/1997 | Iwata ................... 364/725.03 |
| 5,596,518 | 1/1997 | Toyokura et al. ........ 364/725.03 |
| 5,610,849 | 3/1997 | Huang ................. 364/725.03 |
| 5,629,882 | 5/1997 | Iwata ................... 364/725.03 |
| 5,654,910 | 8/1997 | Iwata ................... 364/725.03 |

FOREIGN PATENT DOCUMENTS

| | | |
|---|---|---|
| 0 572262 | 12/1993 | European Pat. Off. . |
| 0 587443 | 3/1994 | European Pat. Off. . |
| 0 592351 | 4/1994 | European Pat. Off. . |
| 3842797 | 6/1990 | Germany . |

OTHER PUBLICATIONS

"Ein neues Konzept zur Video–Codierung für das ISDN–Bildtelefon", Bosch–Tech. Berichte (1986, 1987 & 1989).
"Taschenbuch der Informatic", Steinbuch & Weber (1974).

*Primary Examiner*—Brian Casler
*Assistant Examiner*—Luanne P. Din
*Attorney, Agent, or Firm*—Flehr Hohbach Test Albritton & Herbert LLP

[57] ABSTRACT

A decoder and decoding method is disclosed for real time decompression of coded picture-, video- and film information. The decoder provides an efficient implementation of the functions requiring an optimized processor comprising one multiplier having a minimized chip area. The process of decoding, frame reconstruction, block to raster conversion and color space conversion are combined using concurrent processing and resource sharing techniques. The processes IQ, IDCT, FR and optional CSC use one specialized processor comprising only one multiplier and further elements having no multiplier. The processor comprises process controls which are independent of each other for controlling the decompression.

7 Claims, 7 Drawing Sheets

DECODER AND METHOD FOR DECODING OF CODED PICTURE-, VIDEO- AND FILM INFORMATION

BACKGROUND OF THE INVENTION

1. Field of the Invention

The invention relates to a decoder and a method for decoding picture-, video- and film information.

2. Description of the Related Art

Comparing to storing and transmitting of speech- and audiosignals the storing and transmitting of videosignals requires more complex algorithms for compressing the data to a senseful level, because of the much bigger amount of data. The International Standards Organisation (ISO) is standardizing the methods for coding and decoding. The Motion Picture Experts Group (MPEG) provides a standard, called MPEG-Standard, for achieving compatibility between compression and decompression equipment. It describes algorithms for the compression of moving pictures and bases them on algorithms like quantization (Q), discrete cosine transform (DCT), motion compensation (MC), variable length coding (VLC) and runlength coding (RLC). The standard defines a datastream for the picture information being coded corresponding to a specific syntax. For that a hierarchical layer model is been used organized as followed (see also FIG. 3):

sequence layer: upper level of the datastream

GOP layer: a sequence is divided in one or more GOPs (Group of Picture); one GOP combines a group of single pictures picture layer: describes a single picture slice layer: one picture is divided in one or more slices having variable length macroblock layer: one block having 16×16 luminance pels and corresponding underscanned chrominance pels block layer: one block having 8×8 pel The MPEG1-Standard was defined for coding and decoding datarates of up to 1,5 Mbps. There have been assumed picture resolutions of about 350×250 pixel and picture frequencies of 25 to 30 Hz.

A MPEG1 decoder has to generate pictures in a predefined format out of an incoming MPEG1 datastream using the specified algorithms for decoding and decompression defined in the standard.

The lowest level in the hierarchie of the MPEG datastream is the block layer. It describes a block having 8×8 pels. The different processes in the standardized decompression flow are block oriented, that is to say that they are used for a block of 8×8 pels everytime. The following processes are performed:

DECODING: process for decoding; all parameters and the block oriented videoinformations are decoded from the datastream;

IQ: inverse quantization of the pels of one block;

IDCT: having the pels of one block transformed using a two-dimensional IDCT (2D-IDCT);

FR: frame reconstruction; compensation of the motion estimation

BRC: Block-to-Raster-Conversion; conversion of the block oriented videodata complying with the MPEG standard in line oriented picture format;

CSC: Color space conversion; conversion of the picture data of the YCrCb format to the RGB format and vice versa.

One aspect in a design of a video decoder is an optimized IQ- and IDCT-process. There are known algorithms requiring only a few multiplications.

The parameter for quantization and IDCT are defined in the MPEG-Standard "Information Technology—Coding of Moving Pictures and associated Audio for Digital Storage media up to about 1.5 Mbit/s", Part 2: Video, Draft International Standard ISO/IEC DIS 11172-1, 1993.

The hybridcoding comprises two modes. In the Intra-Mode the picture data are processed directly using DCT and quantization. In the second modus (Non-Intra-Mode) DCT and quantization are processed on+the prediction errors of motion estimated pictures.

The first DCT-coefficient represents the DC-offset of the prediction error and the picture data respectively, while the other so called AC-coefficients representing the higher spectral areas. The MPEG standard defines a different kind of quantization of the DC-coefficients as the AC-coefficients in Intra-mode.

The two dimensional IDCT following the IQ is processed in the decoder for every 8×8 block of invers quantizised DCT coefficients. Transforming a 8×8 block a two dimensional DCT can be divided in 16 one dimensional DCTs each above one vector having 8 values. The one dimensional DCT can be carried out 8 times in the directions of rows and 8 times in the direction of columns.

In the state of the art there are already disclosed one dimensional DCTs using different structures of algorithms having less multiplications for a cheap implementation of the systems. There are well known methods called distributed arithmetic or structures crosslike exchanging the operants, called butterfly. They are especially described in "VLSI Implementations for Image Communications", edited by P. Pirsch, Advances in Image Communications 2, Elsevier Amsterdam 1993. The method of distributed arithmetic disadvantageous requires ROM-tables for processing the accumulated partial results. Advantageously butterfly structures are using partial products several times.

It is useful for the implementation of an IDCT that it can be deduced from a reversed structure of a DCT.

In an article "Practical Fast 1-D DCT Algorithms with 11 Multiplications" von C. Loeffler, A. Lightenberg, G. S. Moschytz, IEEE, pp. 988–991, 1989 a butterfly structure is described, requiring only 11 multiplications and 29 additions for 8 values. This is really a very low need of calculations. Said "Loeffler structure" comprises four steps for the DCT as well as for the IDCT.

Even if the Loeffler-Butterfly structure, as well as the other butterfly structures, are not very regular, this structure is particular attractive for a compact and cheap realization. In one aspect of the invention this choosen structure has to be optimized in view of a sharing of the decoder resources.

In EP 592 351 A2 a videodecoder is described performing the IQ and IDCT using four phases. Disadvantageously there is a need of a lot of implementations for this decoder, because there have to be provided four processors used for IQ and IDCT.

In EP 255 931 A2 a method for transmitting a video signal is disclosed calculating a matrix for the DCT- and IDCT-coefficients multiplying said coefficient with a factor. Disadvantegously the method requires several means for calculation each having a multiplier.

In EP 572 262 A2 a videodecoder is disclosed having a central processor (CPU) and a plurality of coprocessors, connected together using a bus system. The coprocessors are a memory controler for a memory (DRAM), a host interface for the incoming videodata, a decoder for decompression, a IDCT unit and a unit for the output of the picture data. There is a relative high efford for implementing the described system, because of the central processor (CPU). That's the main reason why this solution isn't the most economical implementation being most cost effective. Additionally there is only one memory (DRAM) and it's impossible having processes using memory access which are running parallel. In view of a solution for real time decompression this decoder isn't optimized.

For purposes of ISDN picture decoding in 'Bosch Techn. Berichten 8 (1986/87/89) 6, S. 310–320, "Ein neues Konzept zur Video-Codierung für das ISDN-Bildtelefon" 'written by Thomas Kummerow a decoder is disclosed having a plurality of specialized processor elements of the same kind, each having one multiplier, two arithmetic logic units (ALU's), a control unit and units for rounding. The processor elements are connected with a picture memory. Each of the processor elements are connected with three memory banks being independent of each other. The processor elements are controlled by-a sequencer running a microprogramm. At one time the same programms are running parallel in all the three processor elements using different blocks of the picture. The real-time processing of video datastreams is facilitated by the plurality of the parallel processor elements.

In view of a minimized need bf implementation the disclosed solution requires lower chip area as prior known decoder. Even though each processor element has only one multiplier there is still a need of a plurality of multiplier because of the plurality of parallel processor elements. This causes lots of chip area because multiplier are requiring the biggest area compared to the other elements.

OBJECT OF THE INVENTION

It is an objection of the invention to provide processes for decompression of videodata coded in MPEG1 standard requiring a high need for calculation. Object of the invention is providing a decoder and a method for decoding picture-, video- and film information in real time allowing an efficient hardware implementation of the decoding functions using a minimum of chip area. That is why the decoder should not comprises a central processor unit (CPU). The scheduling of the decoding processes and the processes itself had to be arranged

SUMMARY OF THE INVENTION

In order to achieve the above object, there is provided a decoder as claimed in claim 1 and the method for decoding as claimed in claim 12.

Prior known MPEG1 decoder cores disadvantageously comprising more than one multiplier in the means for IQ, IDCT, FR and CSC. In the invention the IQ, IDCT, FR and optional the CSC are processed using only one processor element, having only one multiplier. This optimizing step could been taken combining methods of concurrent processing and resource sharing, named in claim 2 and in claim 12. A further step to realize the decoder using only one multiplier had to be taken by providing a plurality of independent memory each other connected with the processor element. It results in an implementation optimized in the implementational needs and performance.

According to the aspect of optimization of the IQ and IDCT there is provided a decoder as claimed in claim 6 and the corresponding method as claimed in claim 14.

According to the aspect of optimization of the CSC there is provided a decoder as claimed in claim 7 or 9 and a corresponding method as claimed in claim 15 and 17.

Using the dynamical reloading of the Q-matrix as claimed in claim 11 and 19 advantageously the memory can be decreased.

BRIEF DESCRIPTION OF THE DRAWINGS

The foregoing and other objects, features, aspects and advantages of the present invention will become more apparent from the following detailed description of the present invention when taken in conjunction with the accompanying drawings, wherein:

FIG. 9: is a butterfly structure of the 1-D IDCT used in the invention

DETAILED DESCRIPTION OF THE PREFERRED EMBODIMENTS

Figure 1:
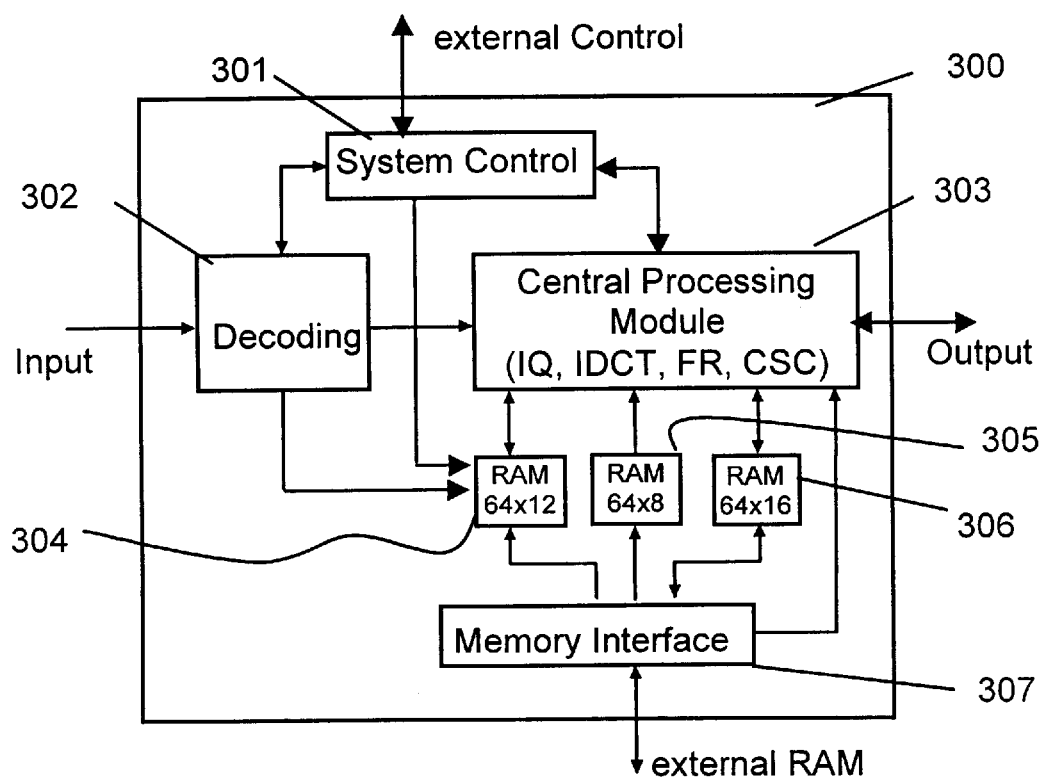
FIG. 1: is the system architecture of the MPEG1 decoder core of the invention

FIG. 1 presents a block diagram of a decoder (300) in accordance to the present invention. Two block buffers and a quantizer matrix memory provide a sufficient fast data access for processing. The two RAMs (304 and 305) are applied for buffering of different data accesses of the processing unit and the environment of the central processing module (303). Each RAM stores 64 data words for one block. Decoded data of a block at the output of the decoding module (302) is written to the first internal RAM (304), where it is read for being inverse quantized. The third internal RAM (306) contains the currently used quantizer matrix. The DCT coefficients are written back to the first internal RAM (304). Then they are inverse cosine transformed. The intermediate matrix is written to the second internal RAM (305). In the intra mode the second internal RAM (305) contains picture data already decoded after a second transform of the intermediate matrix. In the predictive coded mode (non-intra mode) the second internal RAM (305) contains the prediction errors which are added to predicted data of previously decoded pictures by the FR. The contents of the second internal RAM (305) is transferred to the external RAM using the BRC process. For CSC the first internal RAM (304) and the third internal RAM (306) are used as buffer memories. The transmitted quantizer matrices are transferred to the external RAM via the first internal RAM (304).

Figure 2:
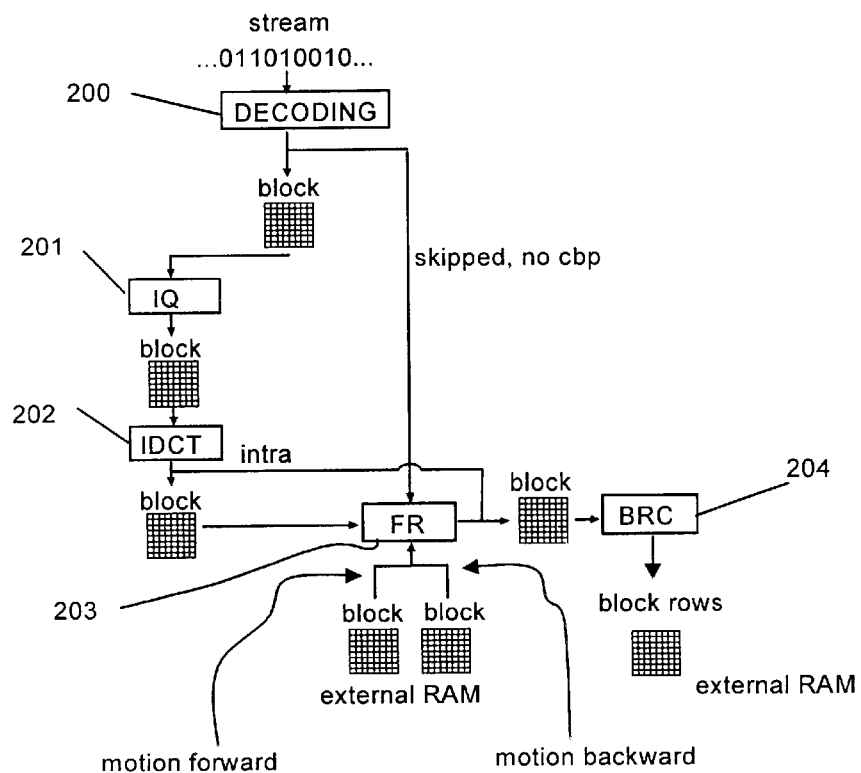
FIG. 2: is a schematic view of the decompression flow used with MPEG1.

FIG. 2 shows systematicly the flow used in MPEG1 standard. Using the decoding process (200) comprimized pel blocks, a picture is build using a plurality of these pel blocks, are generated out of the incoming datastream. The method of further processing of the block depends on it's type. The type marks the used algorithms for compression. If the block is motion compensated and typed "skipped" or "no coded_block_pattern" the FR process (203) is done at once, because no differences between pictures are transmitted. Otherwise first the pels are invers quantizised (201) and transformed in the area of time using the 2D-IDCT (202). Is the type of the block "intra", this means that it's not motion compensated, the BRC process (204) is done afterwards. The FR process is performed if the blocks are motion compensated. In accordance to the type of picture ("motion_forward", "motion_backward") for the compensation the FR process is using a pel block of the reference pictures stored in the external memory (RAM). The following BRC process write the decompressed block to the external memory using a lineorientated order.

The modules are described in the following:

System control (301)

Decompression is done using blockorientated picture elements. Using the concurrent processing scheme, described in claim 1 of the present invention and in the following, the system control (301) is controlling the process of decompression. The processes are started sending start signals and control codes into the data processor (302) and the means for signal processing (303). After processing one pel-block the system control (301) is receiving a ready-signal. Exchange of data between the data processor (302) and the means for signal processing (303) is done by internal random access memories (304–306).

The system control (301) also comprises algorithms for error detection and error control. Synchroniziation of the decoder with external systems is done using control signals.

Decoding (302)

Figure 3:
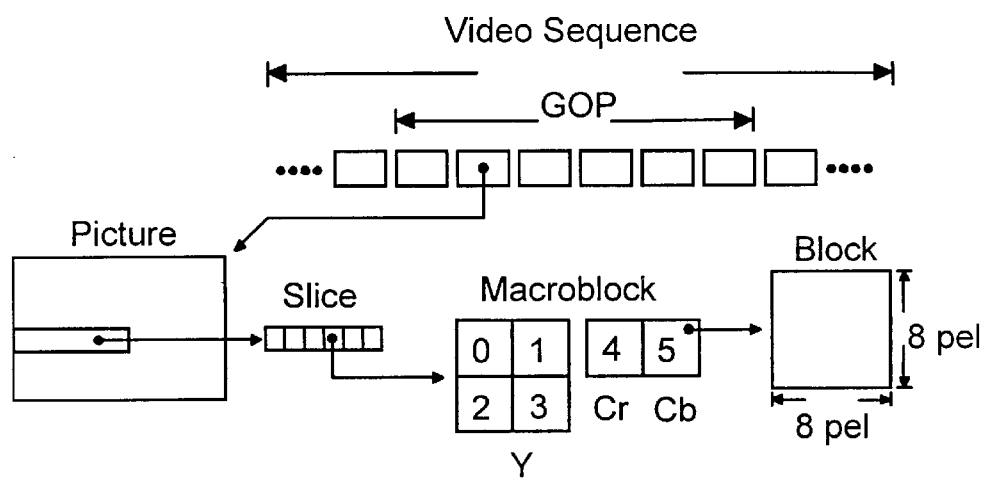
FIG. 3: is a schematic view of the MPEG1 layer model.

In the decoding modul (302) the decoding process is realized processing the sequence up to the block layer. The structure of a datastream, and the layer elements are shown in FIG. 3. The modul comprises a stream parser, a variable length decoder (VLC), a run length decoder and a motion vector reconstruction unit. These methods are well known in the state of the art and described in the standard. Implementation of these function can be done easily.

The whole parameters necessary are stored. The VLC tables are stored in the external memory. To get these informations the modul (302) need access to the external memory.

Central processing modul (303)

The central processing module (302) performs the block orientated processes of the MPEC decoding procedure. These processes are namely inverse quantization (IQ), inverse discrete cosine transform (IDCT), frame reconstruction (FR) with motion compensated interpolation of prediction values and optional color-space-conversion (CSC). The central processing module (303) requires access to an external RAM. Said external RAM stores two P-pictures or a P- and an I-picture for forward prediction of P-pictures or bidirectional prediction of B-pictures. Reconstructed data is written back to the external RAM using a block-to-raster conversion (BRC). After a macro_block line is completely reconstructed said data will be written to the output. Thus, the external RAM contains two macro_block lines of B picture data. During the output procedure a colour space conversion (CSC) is done. This CSC is a transform from the 4:2:0 YCrCb format to the 4:4:4 RGB format and will be described later.

The central processing module (303) is a kind of arithmetic processor carrying out the processes having a high calculational effort. In the CSC the pixel format YCrCb used by the MPEG standard is changed into RGB format. The processes of IQ and FR can be taken out parallel each other.

It is possible for the system realizing real-time decoding using one multiplier only and three adder as arithmetic units.

Memory interface (307)

The memory interface (307) is controling the access to the external RAM.

internal 64×12 RAM (304)

Four different processes are using the first internal RAM (304) as memory. While the process of decoding is active the decoded frequency coefficients of a block are written into said RAM (304) using ZigZag-addressing. When the decoding is finished the IQ use the RAM (304) to store intermediate and endresults of the process. Afterwards the data stored in the RAM (304) are read out again by the process of IDCT.

If the process of CSC is implemented said RAM (304) is used as an input buffer again.

internal 64×8 RAM (305) IQ process use the RAM to store the Q-Matrix values necessary for processing. Optional the CSC process are use the internal RAM (305) as input buffer.

internal 64×16 RAM (306)

Three different processes are using the third internal RAM (306) for storing one block. While the IDCT is running the intermediate and end results are stored in said RAM (306). If the FR process is necessary it uses said RAM (306) in the same kind afterwards. Then the pels are written into the external RAM using the BRC process.

All internal RAMs (304–306) are "dual port" RAMs.

O-Matrix

The Q-matrix is a matrix having 8×8 factors for quantiziation of 8 bit size. Using this matrix every frequency component of each pel-block can be assigned a quantiziation factor. These factors are used in the IQ process. There are two kinds of Q-matrices for "intra" and "non intra" coded blocks respectively.

Default factors are defined for said matrices each, but new Q-matrices can be transfered in the sequence layer also stored in the external RAM. The default values are also stored in the external RAM at the initialisation pro phase of the system. If no Q-matrices are transfered, the standard matrices are used.

The type of the macroblock identicates, if the blocks are "intra" or "non intra" coded. Depending on the type of macroblock the corresponding Q-matrix is loaded into said second RAM (305) before starting said macroblock decoding. Merely a memory sized 64×8 bit is required for storing when using this dynamical loading of the Q-matrix.

External RAM

Among other things the external RAM is storing the reference pictures. Said reference pictures being I- and P-pictures are necessary processing motion compensated interpolation using the FR process. Depending on the type of a block one or two reference blocks have to be read from the memory.

Figure 4:
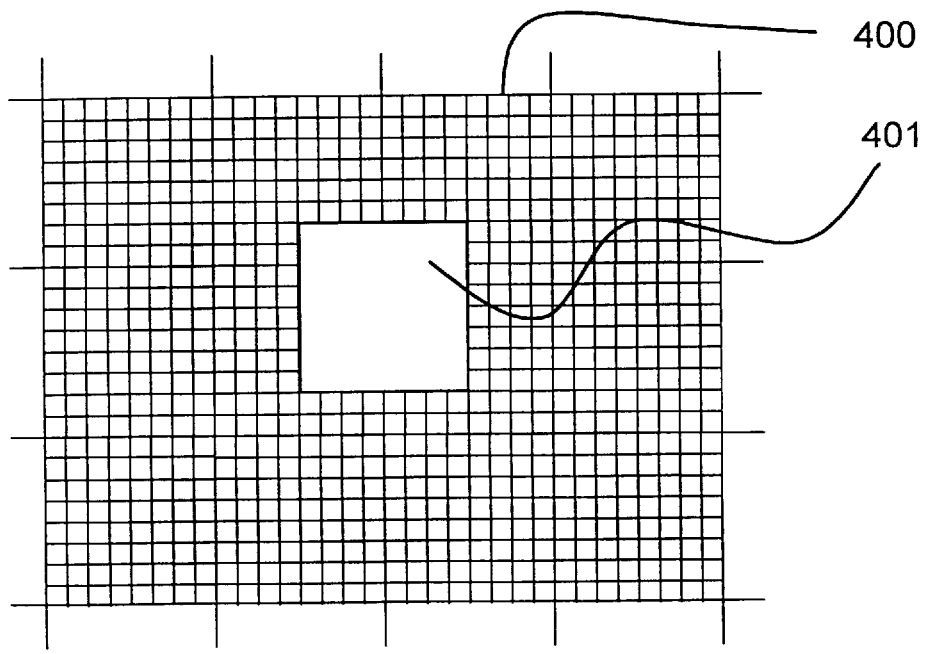
FIG. 4: is a possible location of a reference block in the reference picture used by the FR process.

The position of these blocks being relative to the block to be interpolated depending on the motion vector. The length of the motion vector is limited only by the "motion vector range". Said reference blocks are not depending on block limits and can have any position. In FIG. 4 the connection between a reference picture 400 and any reference block 401 to be read for interpolation is shown.

For effective use of the free memory bandwidth the reference pictures have to be stored in the memory in a special scheme. While reading and writing this data occuring of page breaks should be as rare as possible. The structure of every picture in the MPEG datastream is orientated as macroblock, i.e. every macroblocks line of the picture is decoded from upper left side to lower right side of the picture. If the picture is written one macroblock after the other keeping said form a lot of page breaks would occure reading one reference block, especially while reading a macroblock having a position as shown in FIG. 4.

Therefore it is more senseful writing the reference picture each line after the other. This causes the blocks being processed by the BRC process directly after said decompression. Said BRC process causes the lines of the block being stored in the external RAM the way that the picture is stored line by line using linear addressing. The memory is divided in three sectors each having a linear addressed space. One sector storing the luminance data and the other storing chrominance data Cr and Cb. Said sectors are limited by the page breaks. In between said sectors line by line the respective pels are stored.

There are two advantages proved by said memory. For the first the BRC process is processed directly after decompression and the pictures are stored line by line in the memory. For the second the number of page breaks is minimized and the effectiv bandwidth of the memory usable could be increased.

FR process

The FR predicts picture data with previously decoded data in the predictive-coded mode (non-intra mode) for a block of prediction errors from the IDCT which are stored in the second internal RAM (305) (64×16 bit). Previous picture data and prediction errors are added to obtain decoded data. This data is limited to the interval [0,255]. It is written again to the buffer memory. After this procedure is finished the buffer memory contents is transferred to the external RAM.

Concurrent Processing Schema

There are different times for execution of the processes used for the decompression of blocks. Occuring of time differences while processing the same processes is possible. Said differences are caused by structure and form of the MPEG datastream just being decoded and by different times for memory access as well.

Said variations of the process times causes an asynchronous organisation of the order for decompression. The system has to be able equalizing said different times for processing in average. If processes taking less than an average time of process the free time has to be used compensating processes having longer processing times. This flexibility leads to an efficient implementation of said decoder.

Using the tool of concurrent processing implementation an optimized schedule of processes will be implemented. The submodules features of resource sharing of the different processes also will been taken into consideration using said schedule of process. That way implementation can be optimized referring to needs on hardware and performance.

Figure 5:
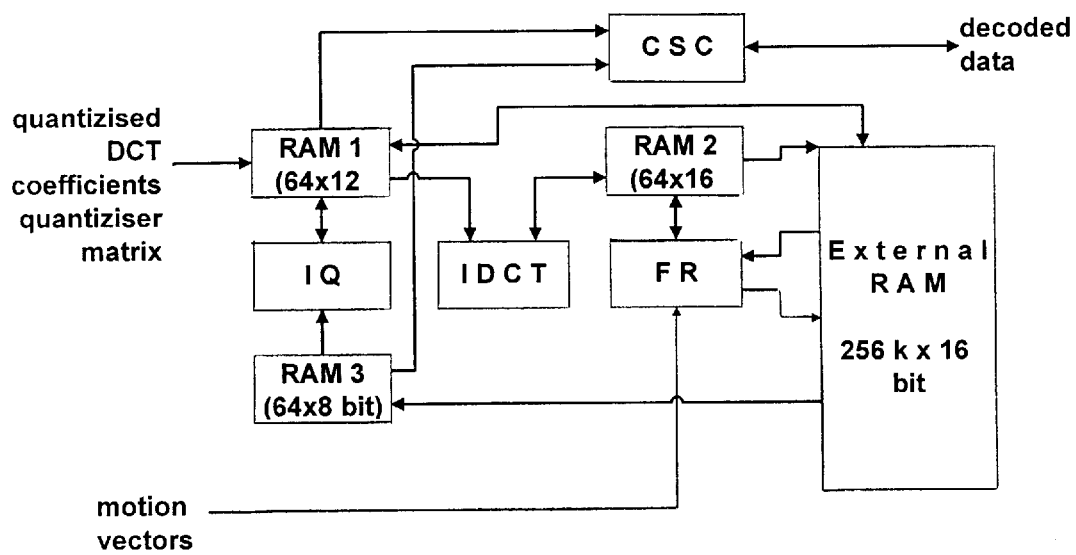
FIG. 5: is the process and data flow used of the invention also showing the model of sharing internal memory

Optimizing the implementation the process schedule has to obey the following rules:

a) decoding, frame reconstruction (FR), block to raster conversion (BRC) and color space conversion (CSC) are not carried out at the same time, b) frame reconstruction (FR) and inverse quantization (IQ) are processed at the same time parallel each other, c) inverse discrete cosinus transform (IDCT) and color space conversion (CSC) are not carried out at the same time, d) the data processor (302) for decoding and the means for signal processing (303), while processing the inverse quantization (IQ), are not using the first internal memory (304) at the same time, e) the process of decoding and the inverse discrete cosinus transform (IDCT) are processed at the same time parallel each other, having a linear memory access and for each address reading the corresponding data for the inverse discrete cosinus transform (IDCT) first and later writing new data to this address by the data processor (302) for decoding, f) inverse discrete cosinus transform (IDCT) and frame reconstruction (FR) are not carried out at the same time, g) the process of block to raster conversion (BRC) and inverse discrete cosinus transform (IDCT) are processed at the same time parallel each other, having a linear memory access and for each address reading the corresponding data for the block to raster conversion (BRC) first and later writing new data to this address by the inverse discrete cosinus transform (IDCT), FIG. 5 shows a block diagram describing the data flow caused by the concurrent processing scheme of the invention sharing the internal RAMs (304.306).

Based on the block diagram shown in FIG. 1 and 5 the concurrent processing scheme will be illustrated using activity diagrams. Said activity diagrams describing the process schedule and the times starting the different processes. At the left side of the diagrams the type of process is listed. Every process having a axis of time tracing the active time of an process using a beam. Above the beam there is a number describing the block number of the macroblock just being decomprimized (see also FIG. 3 for referring to blocks and blocknumbers).

The process of CSC is integrated into the diagrams. In the case converting will be unnecessary this process can be dropped.

I-Picture

Figure 6:
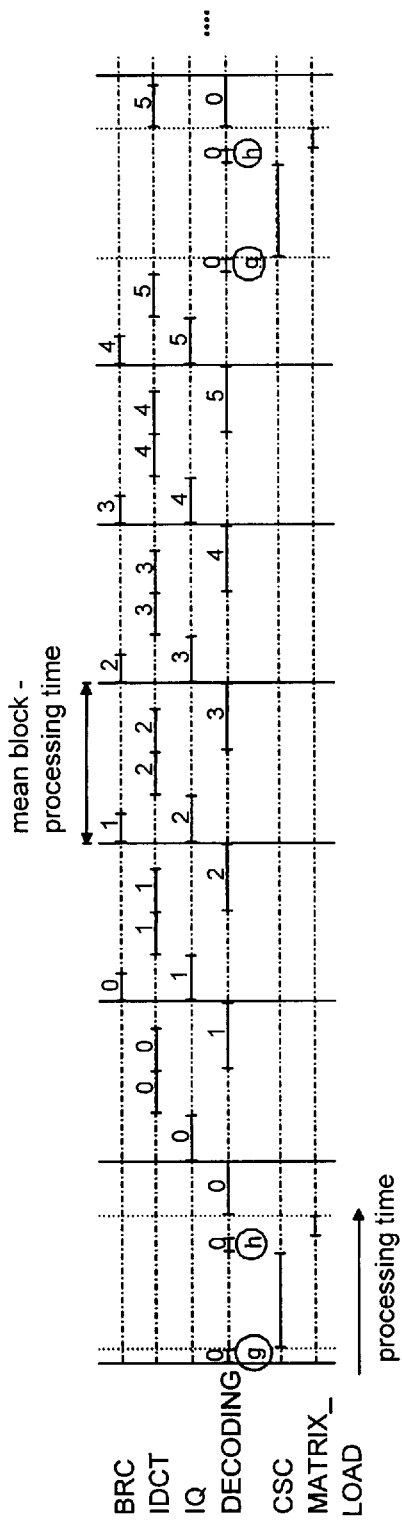
FIG. 6: is an activity diagram for I-pictures

In FIG. 6 an activity diagram for decompression of I-pictures is shown. Also the phase of initialization and the normal run is described.

Having I-pictures the whole blocks are transferred. Motion compensation will be unnecessary processing I-pictures and FR process can be dropped therefore.

Decompression a picture is started running the process of decoding. Then the different layers are decoded and the parameter required are stored. Starting the decoding of a macroblock layer the data processor (302) is signalizing the system control modul (301) by sending a ready signal the next process is free to be started. In said special case the process running in the data processor (302) won't be stopped and is running furtheron trying decoding of all "macroblock_stuffing" and "macroblock_escape" data. This is possible because decoding of this special codewords doesn't require any memory access. If all the "macroblock_stuffing" and "macroblock_escape" data are decoded a next ready signal is generated. This is possible because "macroblock_stuffings" are redundant informations. They can be implemented into the datastream ensuring a constant datarate. The number of "macroblock_stuffings" isn't limited. Using this procedure another process can be started parallel to the decoding of the codewords.

The data processor (302) starts the CSC process directly after receiving the first ready signal. The CSC process is taken out at macroblock layer rather than block layer. The pels are converted and written into the output interface. The process is processed using said means for signal processing (303). The luminance pels are read from the external RAM and written into the second internal memory (305). The chrominance pels are written into the first internal memory (304). They are reloaded dynamical while processing. After finishing the CSC process and generating the second ready signal by the decoding process the process of decoding will be started again and will be stopped as soon as the "coded_ block_pattern" codeword is decoded. Then the process of loading the Q-matrix is started again. Depending on the type of macroblock this process is loading the Q-matrix to be used from the external RAM in the second internal RAM (305). After that decoding process is started again using data processor (302) and the first decoded block is written into the 64×12 RAM (304) having Zigzag-order. Then IQ process is started using means for signal processing (303). The results are stored in the first internal memory (304). Next the 2D-IDCT is started using said means for signal processing (303). The process is separated into two 1D-IDCT started each one after another. The results are stored into the third internal memory (306). The first 1D-IDCT processes the column of a block while the second processes the lines of a block. After finishing processing of the first 1D-IDCT decoding of the second block of the macroblock can be started using said data processor (302) (see block number 1). The pels are written into the first internal memory (304) being free again. After finishing the second 1D-IDCT the results are in the third internal memory (306).

At this time the first block is decompressed. Next the BRC process is started writing the block into said external memory using means for memory access (307). I-pictures are reference pictures and are stored into external RAM. If BRC for block 0 is started the IQ process for block 1 is started at the same time. The process schedule is as shown in said diagram until the next macroblock will be decoded. At this place the decoding process is stopping again decoding "macroblock_stuffings" and "macroblock_escapes" afterwards while CSC process is running.

At this point the actual Q-matrix stored in the second internal memory (305) can be overwritten by the CSC process, because a refresh loading of the matrix is done depending on the type of macroblock. Further the first internal RAM (304) can be used by CSC process, because the first 1D-IDCT requiring data from the RAM is finished.

This process schedule is repeated until the whole picture is decoded.

P,B-Picture

Figure 7:
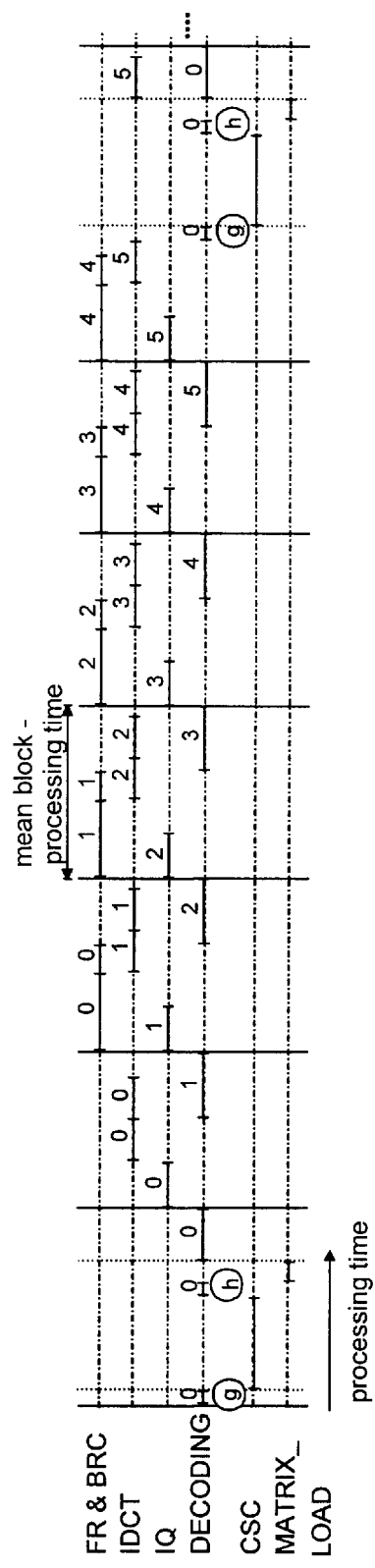
FIG. 7: is an activity diagram for P,B-pictures
Figure 7:
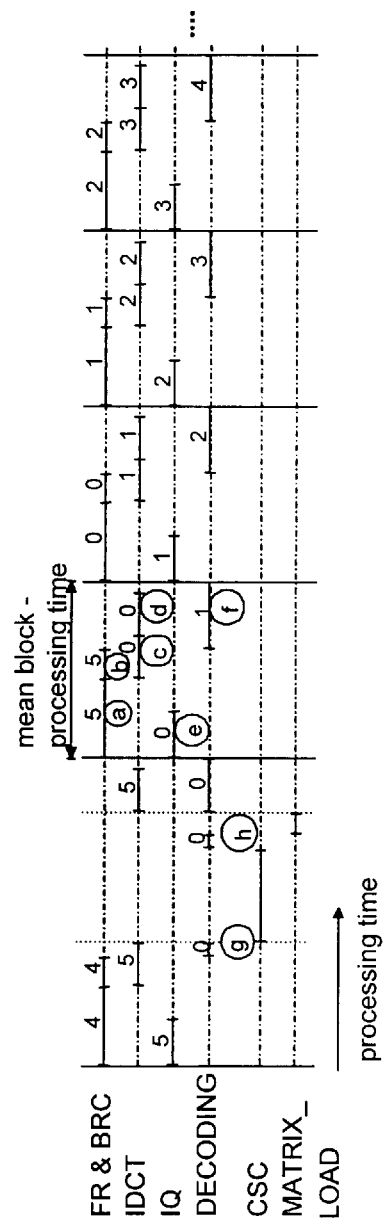
Figure 8:
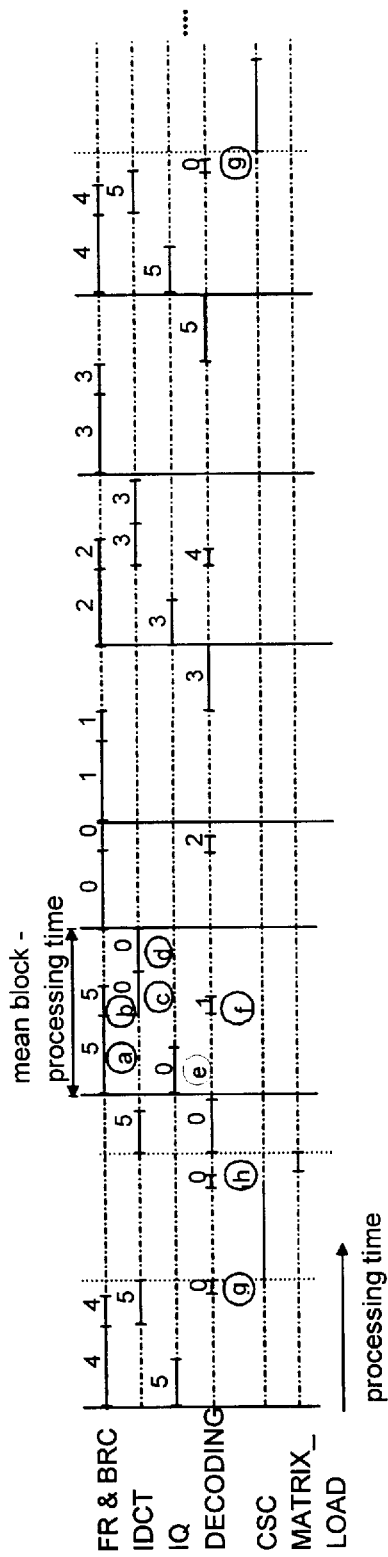
FIG. 8: is an activity diagram for P,B-pictures at special types of macroblocks
Figure 8:
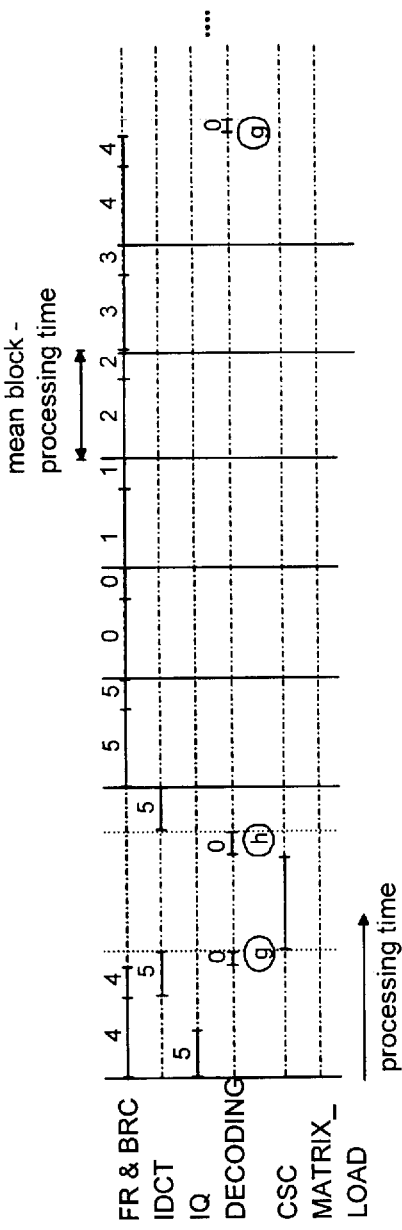

In FIG. 7 and FIG. 8 there is shown the activity diagrams for P,B-Pictures. These types of pictures are motion compensated. That is why the FR process is active while decoding these pictures. Said pictures can be described using a number of different types of macroblock:

intra coded forward motion compensated various coded_block_pattern (cbp) combinations skipped macroblocks or cbp=0

Additionally B-Pictures also can be "backward motion compensated". If a macroblock is "forward motion compensated" and "backward motion compensated" FR is taking two times of the normal time for processing, because interpolation has to be done using two reference blocks. All different types of macroblocks are using different schedules of process.

In FIG. 7 there is shown the initializing phase and the normal run. At the beginning the process schedule keeps the same as the I-pictures schedule. A macroblock being "intra coded" having a following process schedule being identical to the I-picture. If the macroblock is motion compensated the FR process of block 0 and the IQ process are starting together using said means for signal processing (303). The time for processing of IQ is fixed and the time for processing FR is variable.

If FR is ready previous to the IQ, the BRC processing of block 1 can be started. The first 1D-IDCT of block 1 can be started after finishing processing the IQ at the means for signal processing (303). The process of decoding block 2 can be started after generating a special ready signal by the 1D-IDCT.

If an IQ is ready previous to the FR, all processes have to wait for the FR. First the FR is finished the BRC for block 0 and 1D-IDCT for block 1 can be started. Finishing BRC the process of decoding block 2 can be started. Finishing the first 1D-IDCT the second can be started. Finishing the process of decoding block 2 and the 1D-IDCT of block 1 the process schedule is started again.

The activity diagrams drawn in FIG. 8 describing two special cases. The upper diagram shows the process schedule for a special value of "cbp". If a block is comprimized without difference values (coded_block_pattern(i)=0) processing IQ and IDCT of said blocks is unnecessary.

The other diagram shows the process schedule if "cbp" equals zero or if there is a "skipped" macroblock.

In the following the processes are described in detailes. Special attention is drawn to the IDCT and the CSC being two important aspects of the invention.

Inverse quantiziation

The inverse quantization (IQ) is done block-oriented. The top left coefficient in a block is called DC coefficient whereas all remainder entries are called AC coefficients.

In the predictive-coded (non-intra) mode all coefficients are inversely quantized according to $$c(u,v)=((2 \cdot i(u,v)+\text{sign}(i(u,v))) \cdot q \cdot m(u,v))/16 \qquad (1)$$

with the sign operator $$\text{sign}(i(u,v)) = \begin{cases} -1 & \text{if } i(u,v) < 0 \\ 0 & \text{if } i(u,v) = 0 \\ +1 & \text{if } i(u,v) > 0 \end{cases}$$

m(u,v) are the entries of the quantization matrix, c(u,v) the entries of the coefficient matrix, and i(u,v) the entries of the quantized coefficient matrix. i(u,v) is always in the range [−255, +255]. q is the quantizer scale in the range [1,31]. The quantizer scale q may be changed with each new macro_block or new slice.

The addition of sign(i(u,v)) in equation (1) provides odd valued inputs for the first multiplication.

In the intra mode AC and DC coefficients are coded in different ways because the DC coefficient of a block is more correlated with the DC coefficient of the preceding block. On the other hand the AC coefficients are not well correlated.

All intra coded AC coefficients are inversely quantized according to $$c(u,v)=(2 \cdot i(u,v) \cdot q \cdot m(u,v))/16 \qquad (2)$$

If the least significant bit of c(u,v) in equations (1) and (2) is zero it is quantized to odd valued numbers (see example in Table 2.1-2):

$$d(u,v) = \begin{cases} c(u,v) & \text{if } LSB(c(u,v)) = 1 \text{ or } c(u,v) = 0 \\ c(u,v) - \text{sign}(c(u,v)) & \text{if } LSB(c(u,v)) = 0 \end{cases} \qquad (3)$$

This quantization was found to avoid accumulations of mismatch errors. In a final step d(u,v) is limited to the range [−2048,+2047].

Intra-coded DC coefficients are coded by a DPCM technique where the DC coefficient $d(0,0)_{past\_intra}$ of the previously coded block becomes the predictor of the present DC coefficient $$d(0,0)_{intra} = d(0,0)_{past\_intra} + 8 \cdot i(0,0)_{intra} \qquad (4)$$

The DC coefficient of a chrominance block is decoded using the corresponding value of the corresponding previous chrominance block. At the beginning of each slice or if the previous macro block is predictive-coded all three DC predictors for luminance data and the two chrominance components are set to the value 1024.

The MPEG-1 standard requires a default intra and a default non-intra matrix. Two further intra and non-intra matrices may be transmitted with each new sequence. All entries of the default non-intra matrix are 16. The two default matrices or the two transmitted matrices or a combination of default and transmitted matrix may be applied.

All matrix entries are non-zero unsigned integers. Thus, the multiplication does not provide zero unless i(u,v) is not zero.

Inverse discrete cosinus transformation (IDCT)

The 2-D IDCT is applied for each 8-by-8 block in the decoder. In order to reduce the computational effort, a 2-D IDCT can be decomposed into 2·8 1-D 8-point IDCTs. As IDCTs use the reverse order of the algorithmic structure of corresponding DCTS, the structures of the IDCT are discussed on the base of the DCT. The 8-point DCT is specified in the MPEG-I standard by:

$$F(u) = \frac{1}{2} \cdot C(u) \cdot \sum_{x=0}^{7} f(x) \cdot \cos\left(\frac{p \cdot u \cdot (2 \cdot x + 1)}{16}\right), \text{ with} \quad (5)$$

$$C(0) = 1/\sqrt{2}, \quad C(u > 0) = 1$$

The implementation costs of a DCT are determined by the number of multiplications. A highly sophisticated scheme for butterflies with a low number of multiplications is proposed by Loeffler. The Loeffler butterfly structure is based on modified constants of the DCT in equation (5)

$$F(u) = C_{DCT} \cdot A(u) \cdot \sum_{x=0}^{7} f(x) \cdot \cos\left(\frac{p \cdot u \cdot (2 \cdot x + 1)}{16}\right) \quad (5)$$

where Loeffler proposes $C_{DCT} = \sqrt{2}$. As (5) and (6) have to be equal, a solution of $1/2 \cdot C(u) = C_{DCT} \cdot A(u)$ results for u=0 in $$F(0) = \frac{\sqrt{2}}{4} \cdot \sum_{x=0}^{7} f(x) = \frac{\sqrt{2}}{4} \cdot G(0) \quad (7)$$

and for any other u>0 in $$F(u) = \frac{\sqrt{2}}{4} \cdot \sqrt{2} \cdot \sum_{x=0}^{7} f(x) \cdot \quad (8)$$

$$\cos\left(\frac{p \cdot u \cdot (2 \cdot x + 1)}{16}\right) = \frac{\sqrt{2}}{4} \cdot G(u)$$

with $$G(u) = B(u) \cdot \sum_{x=0}^{7} f(x) \cdot \cos\left(\frac{p \cdot u \cdot (2 \cdot x + 1)}{16}\right), \quad (9)$$

$$B(0) = 1, B(u > 0) = \sqrt{2}$$

G(u) is the result of the DCT performed by the Loeffler butterfly structure. In order to obtain the desired DCT coefficients F(u) of equation (5), all results of the Loeffler DCT have to be multiplied with $\sqrt{2}/4$.

Thus, an IDCT processed via the reverse order of the Loeffler DCT butterfly structure requires a multiplication of the output vector $g_s(x)$ according to $$f(x) = \frac{4}{\sqrt{2}} \cdot g(x) \quad (10)$$

The 2-D IDCT required for MPEG decoding can be decomposed into 2·8 1-D 8-point Loeffler butterfly IDCTs where the multiplications $(4/\sqrt{2})^2 = 16/2 = 8$ is realised by simple shifts.

The accuracy of the IDCT was simulated. A 16-bit representation of the operands was found to satisfy the corresponding IEEE standard specification. As output data from the preceding IQ is represented by 12 bit, it is suitable to shift IDCT coefficient data at the IQ output left from 12 to 16 bit (multiplication by 16) and to shift data at the IDCT output right by one bit (division by 2). These shifts substitute the multiplications of equation (10) and guarantee the necessary accuracy.

Figure 9:
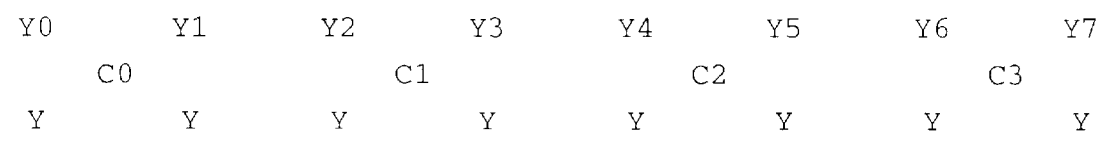

The butterfly structure of the 1-D IDCT in FIG. 9 consists of three building block types bb1, bb2, and bb3. A building block represents a butterfly. The simplest butterfly of the Loeffler DCT is defined by $$O_0 = I_0 + I_1, \quad (11)$$

$$O_1 = I_0 - I_1$$

The corresponding butterfly of the IDCT (FIG. 9) is bb1 with $$I_0 = \frac{1}{2} \cdot (O_0 + O_1), \quad (12)$$

$$I_1 = \frac{1}{2} \cdot (O_0 - O_1)$$

The second building block bb2 bases on the rotation operations $$y_0 = a \cdot x_0 + b \cdot x_1, \quad (13)$$

$$y_1 = -b \cdot x_0 + a \cdot x_1$$

with $$a = k \cdot \cos\frac{n \cdot p}{N},$$

$$b = k \cdot \sin\frac{n \cdot p}{N}.$$

The corresponding rotation operations (bb2) of the IDCT are $$x_0 = \frac{1}{k^2} \cdot (a \cdot y_0 - b \cdot y_1), \quad (14)$$

$$x_1 = \frac{1}{k^2} \cdot (b \cdot y_0 + a \cdot y_1).$$

With $$k^2 = a^2 + b^2 = \left(k \cdot \cos\frac{n \cdot p}{N}\right)^2 + \left(k \cdot \sin\frac{n \cdot p}{N}\right)^2$$

these equations specify together the rotation equations $$x_0 = \frac{1}{k} \cdot \left(\cos\frac{n \cdot p}{16} \cdot y_0 - \sin\frac{n \cdot p}{16} \cdot y_1\right), \quad (15)$$

$$x_1 = \frac{1}{k} \cdot \left( \sin\frac{n \cdot p}{16} \cdot y_0 + \cos\frac{n \cdot p}{16} \cdot y_1 \right)$$

The third butterfly type bb3 of the Loeffler DCT is specified by $r = s \cdot \sqrt{2}$ and for the IDCT by $$s = r/\sqrt{2}. \tag{16}$$

In order to reduce the number of multiplications further, Loeffler proposes for the DCT the precomputation of a partial product for bb2. This procedure is also suitable for inverse transform purposes. The corresponding rotation operations for bb2 of the IDCT are $$x_0 = \frac{1}{k^2} \cdot (-(a+b) \cdot y_1 + a \cdot (y_0 + y_1)), \tag{17}$$

$$x_1 = \frac{1}{k^2} \cdot (-(a-b) \cdot y_0 + a \cdot (y_0 + y_1))$$

These two equations require three multiplications and three additions. This IDCT scheme has to be performed 8 times horizontally and vertically each to obtain the complete 2-D 8-point IDCT.

Two or three parallel functional blocks would be sufficient to perform the entire 2-D IDCT in real time for the MPEG-1 decoding process. As each butterfly requires two or three additions, and one or three multiplications, the structure of the IDCT should be investigated that way to obtain a butterfly processing unit.

In order to obtain a two dimensional (2-D) IDCT, the 1-D IDCT Loeffler Butterfly Structure is performed eight times in a row and eight times in a column order. The processing unit consists of three adders and a multiplier. The register memory contains the eight intermediate vector data between the four steps of the Loeffler IDCT scheme. The DCT coefficients are stored in the first internal RAM (304). The result vectors of each 1-D IDCT are written to the second internal RAM (305). This memory contains all intermediate matrix data after the first eight 1-D IDCTs. The row-column exchange and the data reordering is obtained by an appropriate read and write access. Finally, the second internal RAM (305) contains the inverse transformed data. Its value is limited to the range [−256,255]. During the access to the second internal RAM (305), the first internal RAM (304) is applied for other purposes.

In order to obtain a small control overhead, the same parallel addition and subtraction (operations A2 and S3) are applied for butterfly bb2 as well as for A and S of bb1. Thus, $y_1$ is multiplied with the negative rotation constant $-(a+b)/k^2$ (operation M1) and the other two operations M1 and M2 are done with the rotation constants $(a-b)/k^2$ and $a/k^2$. A further simplification of the architecture is possible by changing the rotation constants for bb2[2]. At $x_1$ of bb2 negative data has to be input: $S_0(7) = -G(5)$. In order to avoid additional circuits for inversion, the three rotation constants $(b+a)/k^2$, $-(b-a)/k^2$, and $b/k^2$ are used instead of $(a-b)/k^2$, $-(a+b)/k^2$, and $a/k^2$. This corresponds to a modification of the rotation equations to $$S_1(4) = \frac{1}{k^2} \cdot (-(b-a) \cdot G(5) + b \cdot (G(3) + G(5))), \tag{18}$$

$$S_1(7) = \frac{1}{k^2} \cdot (-(b+a) \cdot G(3) + b \cdot (G(3) + G(5)))$$

CSC process

The MPEG decoder outputs four luminance data blocks (Y) and two chrominance component blocks (Cr, Cb) per macro block. This corresponds to a 4:2:0 sampling ratio. For a video display or further processing it is necessary to convert the decoded YCrCb data to the RGB format with a 4:4:4 sampling ratio. This procedure is called colour space conversion (CSC).

The three components R', G', and B' are related to Y, Cr, and Cb by the matrix equation:

$$\begin{pmatrix} Y \\ Cr \\ Cb \end{pmatrix} = \frac{1}{256} \cdot \begin{pmatrix} 77 & 150 & 29 \\ 131 & -110 & -21 \\ -44 & -87 & 131 \end{pmatrix} \cdot \begin{pmatrix} R' \\ G' \\ B' \end{pmatrix} + \begin{pmatrix} 0 \\ 128 \\ 128 \end{pmatrix}. \tag{19}$$

R', G', B', and Y have 220 levels between [16:235]. Cr and Cb have 225 levels around zero at 128 between [16:240]. For a VGA display the three components R, G, and B require 256 levels between 0 and 255. With C=16237 the inversion of equation 1 provides $$\begin{pmatrix} R' \\ G' \\ B' \end{pmatrix} = \frac{1}{C} \cdot \begin{bmatrix} C & 22173 & -40 \\ C & -11363 & -5416 \\ C & -99 & 28120 \end{bmatrix} \cdot \begin{pmatrix} Y \\ Cr - 128 \\ Cb - 128 \end{pmatrix} \tag{20}$$

In order to obtain the full range of 256 levels these results have to be scaled with D=255/219 and shifted with 16 to:

$$\begin{pmatrix} R \\ G \\ B \end{pmatrix} = D \cdot \begin{pmatrix} R' - 16 \\ G' - 16 \\ B' - 16 \end{pmatrix} = \frac{D}{C} \cdot \tag{21}$$

$$\begin{bmatrix} C & 22173 & -40 \\ C & -11363 & -5416 \\ C & -99 & 28120 \end{bmatrix} \cdot \begin{pmatrix} Y \\ Cr - 128 \\ Cb - 128 \end{pmatrix} - D \cdot \begin{pmatrix} 16 \\ 16 \\ 16 \end{pmatrix}$$

As the entries −44 and −99 of the transform matrix in equation 3 are rather small, they are neglected. The conversion from the decoded YCrCb data to the RGB format is specified by:

$$\begin{pmatrix} R \\ G \\ B \end{pmatrix} = \begin{bmatrix} D & a_{12} & 0 \\ D & a_{22} & a_{23} \\ D & 0 & a_{33} \end{bmatrix} \cdot \begin{pmatrix} Y \\ Cr \\ Cb \end{pmatrix} + \begin{pmatrix} c_1 \\ c_2 \\ c_3 \end{pmatrix} \tag{22}$$

with the entries $$a = D$$

$$a_{12} = \frac{D}{C} \cdot 22173 \approx 1.590$$

$$a_{33} = \frac{D}{C} \cdot 28120 \approx 2.017$$

$$a_{22} = -\frac{D}{C} \cdot 11363 \approx 0.8148$$

$$a_{23} = -\frac{D}{C} \cdot 5416 \approx 0.3884$$

$$c_1 = -D \cdot \left( 16 + \frac{128}{C} \cdot 22173 \right) \approx -222.16$$

-continued $$c_1 = -D \cdot \left( 16 + \frac{128}{C} \cdot (11363 + 5416) \right) \approx 135.39$$

$$c_1 = -D \cdot \left( 16 + \frac{128}{C} \cdot 28120 \right) \approx -276.75$$

In order to obtain a conversion from the 4:2:0 sampling ratio to the 4:4:4 sampling ratio, four RGB triples are computed of four Y data and two chrominance components Cr and Cb FIG. 9 below shows two lines of 8 luminance data with a line of 2 by 4 chrominance components.

The two chrominance components $Cr_i$ and $Cb_i$ are specified by $C_i$. It is applied together with $Y_{2i}$ and $Y_{2i+1}$ to compute $R_{2i}$, $G_{2i}$, $B_{2i}$, $R_{2i+1}$, $G_{2i+1}$, and $B_{2i+1}$.

RGB data is output line-by-line. Thus, the transform of four RGB triples from four Y data and two chrominance components Cr and Cb is also done line-by-line where intermediate products of $Cr_i$ and $Cb_i$ are stored in a line memory. In order to avoid this memory the multiplications with $Cr_i$ and $Cb_i$ are repeated again with each second line. Thus, the transform of two RGB triples from two Y data and two chrominance components Cr and Cb requires 5 multiplications and 7 additions each. The sequence is shown in table 1. Conversion of an following triple can be started in step 6.

TABLE 1

Sequence of multiplications and additions for two triple of eight pels of 4:2:0 coded data

| step | multiplication | addition | addition |
|---|---|---|---|
| 1 | Ma = a · Y | | |
| 2 | $M_{12} = a_{12} \cdot Cr$ | | |
| 3 | $M_{22} = a_{22} \cdot Cr$ | r' = Ma + $M_{12}$ | |
| 4 | $M_{23} = a_{23} \cdot Cb$ | g'' = Ma + $M_{22}$ | r = r' + $c_1$ |
| 5 | $M_{33} = a_{33} \cdot Cb$ | g' = g'' + $M_{23}$ | |
| 6 | | b' = Ma + $M_{33}$ | g = g' + $c_2$ |
| 7 | | | b = b' + $c_2$ |

Another sequence, also usable is listed in table 1, having 6 multiplications and 10 additions each. Table 1 shows the sequence of CSC operations in one multiplier and two adders which are available in the central processing module (303). The local variables $r'_i$, $g''_i$, $g'_i$, $b'_i$, $Ma_{2i}$, $Ma_{2i+1}$, $M_{12i}$, $M_{22i}$, $M_{23i}$, and $M_{33i}$ are applied. The transform of two RGB triples requires 6 clock cycles.

TABLE 2

Sequence of multiplications and additions for two triple of eight pels of 4:2:0 coded data

| step | multiplikation | addition | addition |
|---|---|---|---|
| 1 | $Ma_{2i} = a \cdot Y_{2i}$ | | |
| 2 | $Ma_{2i+1} = a \cdot Y_{2i+1}$ | | |
| 3 | $M_{12i} = a_{12} \cdot Cr_i$ | | |
| 4 | $M_{22i} = a_{22} \cdot Cr_i$ | $r'_i = c_1 + M_{12i}$ | |
| 5 | $M_{23i} = a_{23} \cdot Cb_i$ | $g''_i = c_2 + M_{22i}$ | $R_{2i} = r'_i + Ma_{2i}$ |
| 6 | $M_{33i} = a_{33} \cdot Cb_i$ | $g'_i = g''_i + M_{23i}$ | $R_{2i+1} = r'_i + Ma_{2i+1}$ |
| 7 | | $b'_i = c_3 + M_{33i}$ | $G_{2i} = g'_i + Ma_{2i}$ |
| 8 | | | $G_{2i+1} = g'_i + Ma_{2i+1}$ |
| 9 | | | $B_{2i} = b'_i + Ma_{2i}$ |
| 10 | | | $B_{2i+1} = r'_i + Ma_{2i+1}$ |

The CSC is done after the BRC of a macro block is finished. In order to obtain a line-oriented output and to avoid an overflow in the external RAM 4·64 luminance data Y and their corresponding chrominance component data Cr and Cb of the previous macro block line are transformed.

Thus, two macro block lines are accessed in the external RAM. The present is written with just decoded macro block data and the previous is read for the CSC. I- and P-picture data to be transformed is accessed at the same location as for the FR. B-picture data has to be stored in a two macro block line space where the order of macro block lines to be written and read is exchanged after a macro block line is finished.

The CSC is done before the second IDCT of the last block in a macro block is computed. As the second internal RAM (305) still contains the intermediate transform matrix data, the first internal RAM (304) and the quantizer matrix memory stored in the third internal RAM (306) are used as local buffers CSC. One half of each memory is written where the other half is read. Thus, each half contains 32 luminance data and two by 16 chrominance component data.

These data is read from the external RAM. The read access on 32/2 16 bit luminance data words requires at least 3+2 * 32/2=35 cycles. The access on 16/2 16 bit data words of each chrominance component requires at least 2 * (3+2 * 16/2)=38 cycles. Each macro block represents data for 16 * 16 RGB triples. In order to process data in time, 256 RGB triple have to be computed. Then, the read access for 256 luminance data and their corresponding chrominance data requires (35+38)·256/32=584 cycles. As can be seen in Table 1, the processing of two consecutive RGB triple requires 6 cycles. This corresponds to 768 cycles for 256 RGB triple. The processing time supersedes the data transfer time from the external RAM to the first internal RAM (304) and the third internal RAM (306).

Interpolation

The decoded motion vectors describe the spatial offset of blocks to be read from the external RAM in whole pel units. Usually motion is coded with half pel precision which is signed by the right_half_for, right_half_back, down_ half_for, and down_half_back flags. For half pel shifts data from the external RAM must be interpolated horizontally, vertically, or in both directions. Data is interpolated of four adjacent pels in a block according to the four modi:

$$Int1 = ( (A+A)+(A+A) )//4$$

(no interpolation)

$$Int2 = ( (A+B)+(C+B) )//4$$

(horizontal interpolation)

$$Int3 = ( (A+A)+(C+C) )//4$$

(vertical interpolation)

$$Int4 = ( (A+B)+(C+D) )//4$$

(horizontal and vertical interpolation) "/ /" means an integer division with rounding to the nearest integer. The divisions by two and four are are realised by shifts. The sums are always positive and halfinteger values are incremented.

These four modi mentioned above exist for forward and backward motion compensation each. The interpolated data is the prediction value. It is added to the prediction error pred_err from the output of the IDCT:

$$peldata = pred\_err + Int$$

peldata is written into the 64×16 bit buffer memory. In order to avoid visual artefacts due to rounding errors, peldata is limited between the values 0 and 255.

For a bi-directional motion compensated prediction in B pictures the average of forward and backward interpolated data is added to the prediction error:

$$peldata_B = (2 \cdot pred\_err + Int_{for} + Int_{back})//2 \quad (23)$$

When forward motion compensated interpolation is done first, the interpolated data is added to the prediction error, and the sum $2 \cdot pred\_err + Int_{for}$ is written to the second internal RAM (305). In the next step the backward motion compensated interpolation is done, its result is added to the partial sum in the second internal RAM (305), and the decoded pel data is written to the second internal RAM (305) again.

We claim:

1. Decoder for decoding datastreams of picture-, video- and film information comprising a data processor (302) for decoding a datastream and for processing a block to raster conversion (BRC), signal processing means (303) for processing digital picture signal processes, wherein said processes comprise inverse quantization (IQ), inverse cosine transformation (IDCT), frame reconstruction (FR) and optionally color space conversion (CSC), internal memory (304–306) comprising a plurality of RAM segments having independent access to each other, a memory interface (307) for accessing an external memory, control unit means (301) for controlling said data processor (302) and said signal processing means (303), wherein the data processor (302), the signal processing means (303) and the internal memory (304–306) are connected to the memory interface (307), and wherein the signal processing means (303) comprises arithmetic units and a multiplexer connected with each other for processing said IQ, IDCT and FR and optionally CSC, wherein the signal processing means (303) is not a program controlled central microprocessor (CPU), the signal processing means (303) further comprising process control means for controlling the digital picture signal processes independently from each other responsive to the control unit means (301), the control unit means (301) coordinating the digital picture signal processes for sending start signals to the signal processing means (303) responsive to the process control means, and the decoder having exactly one means for signal processing (303) comprising exactly one multiplier.

2. Decoder as claimed in claim 1, wherein a) decoding, frame reconstruction (FR), block to raster conversion (BRC) and color space conversion (CSC) are not carried out at the same time, b) frame reconstruction (FR) and inverse quantization (IQ) are processed at the same time parallel each other, c) inverse discrete cosinus transform (IDCT) and color space conversion (CSC) are not carried out at the same time, d) the data processor (302) for decoding and the means for signal processing (303), while processing the inverse quantization (IQ), are not using the first internal memory (304) at the same time, e) the process of decoding and the inverse discrete cosinus transform (IDCT) are processed at the same time parallel each other, having a linear memory access and for each address reading the corresponding data for the inverse discrete cosinus transform (IDCT) first and later writing new data to this address by the data processor (302) for decoding, f) inverse discrete cosinus transform (IDCT) and frame reconstruction (FR) are not carried out at the same time, g) the process of block to raster conversion (BRC) and inverse discrete cosinus transform (IDCT) are processed at the same time parallel each other, having a linear memory access and for each address reading the corresponding data for the block to raster conversion (BRC) first and later writing new data to this address by the inverse discrete cosinus transform (IDCT).

3. Decoder as claimed in claim 1 or 2 wherein the internal memory (304–305) comprises a first memory having a size of 64×12 bit, a second memory having a size of at least 64×8 bit and a third memory having a size of at least 64×16 bit.

4. Decoder as claimed in claim 1, wherein the control unit means (301), the data processor (302), the means for signal processing (303) and the means for memory access (307) are generating signals characterizing system status, process errors and signal errors, characterized in, that the decoder comprises means for coding and decoding the generated signals and that the signals are transmitted in coded form.

5. Decoder as in claim 1 for decoding a macroblock having Q-matrices stored in a RAM, and further comprising a first RAM (305) into which the corresponding Q-matrix is loaded before starting said macroblock decoding.

6. A method for decoding datastreams of picture-, video- and film-information employing a data processor having single processing means with an internal memory, and which utilizes the processes of frame reconstruction (FR), block-to-raster conversion (BRC), color space conversion (CSC), inverse quantization (IQ) and inverse discrete cosine transform (IDCT), the method comprising the steps of:

a) non-simultaneously decoding FR, BRC and CSC, b) simultaneously processing FR and IQ, c) non-simultaneously processing IDCT and CSC, d) processing IQ while not simultaneously accessing said internal memory, e) said step of (a) of decoding is carried out simultaneously with processing of said IDCT and providing addresses in said linear memory corresponding to said data for the IDCT while first accessing a selected IDCT address and later writing new data to the selected IDCT address responsive to said step of (a) of decoding, f) simultaneously carrying out said IDCT and FR processes, and g) non-simultaneously processing said BRC and IDCT with said linear memory having addresses corresponding to data for said BRC and first accessing a selected BRC address and later writing new data to the selected BRC address responsive to said IDCT process.

7. Method as claimed in claim 6 for decoding a macroblock having Q-matrices stored in an external RAM, wherein depending on the type of macroblock to be decoded the corresponding Q-matrix is loaded into a second RAM (305) before starting said macroblock decoding.

* * * * *